(No Model.)
G. GOFF.
LENS MEASURE.
No. 579,573.  Patented Mar. 30, 1897.
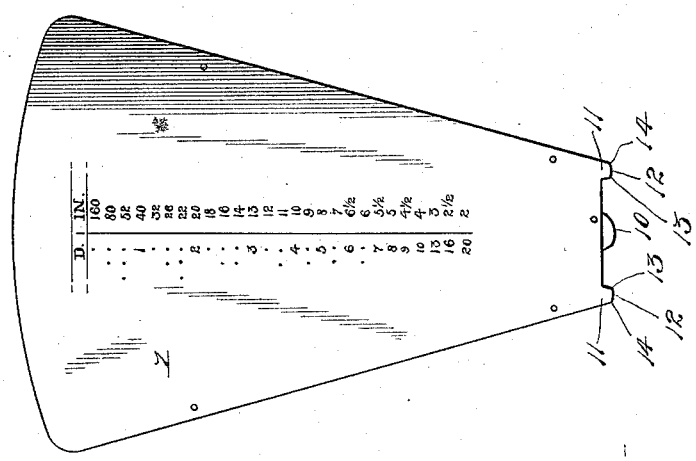
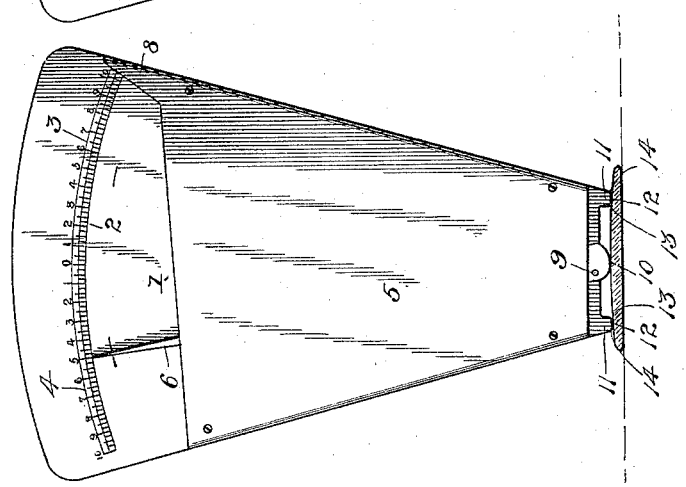
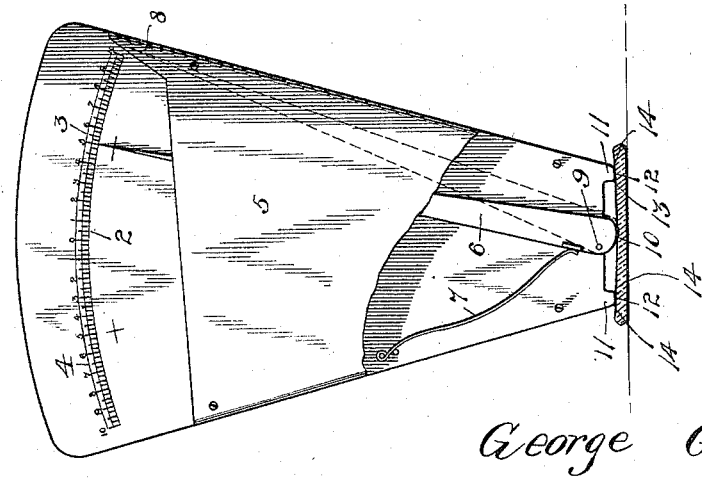
Witnesses
E. N. Monroe
Inventor
George Goff,
By his Attorneys,
C. A. Snow & Co.

United States Patent Office.

GEORGE GOFF, OF IOLA, KANSAS, ASSIGNOR OF ONE-HALF TO J. H. JOHNSON, OF KANSAS CITY, MISSOURI.

LENS-MEASURE.

SPECIFICATION forming part of Letters Patent No. 579,573, dated March 30, 1897.

Application filed January 21, 1896. Serial No. 576,322. (No model.)

*To all whom it may concern:*

Be it known that I, GEORGE GOFF, a citizen of the United States, residing at Iola, in the county of Allen and State of Kansas, have invented a new and useful Dioptric Measure for Lenses, of which the following is a specification.

My invention relates to a device for measuring the convexity and concavity of lenses, particularly those employed for eyeglasses, spectacles, &c., to determine the strength in dioptrics in accordance with the method employed by opticians for designating the different angles of refraction of rays of light passing through a given transparent medium.

The object in view is to provide a simple apparatus whereby the number of the glass expressed in dioptrics may be ascertained with accuracy preparatory to labeling the lenses or to prevent mistakes in filling orders due to the inaccurate marking thereof.

Further objects and advantages of this invention will appear in the following description, and the novel features thereof will be particularly pointed out in the appended claims.

In the drawings, Figure 1 is a view of a device constructed in accordance with my invention, a concave lens being shown in section in operative relation with the contact-points. Fig. 2 is a similar view showing a convex lens in section in operative relation with the contact-points. Fig. 3 is a rear view to show the comparative scale which I preferably arrange upon the reverse side of the apparatus for reference.

Similar numerals of reference indicate corresponding parts in all the figures of the drawings.

1 designates a sector-shaped plate bearing a continuous segmental scale 2, the graduations upon said scale having a common initial point represented by the numeral "0," and the concave and convex sections 3 and 4 of the scale increasing in opposite directions from said initial point toward the extremities of the scale. Pivotally mounted upon said plate and preferably operating between the same and a covering-plate 5 is an index 6, which is normally held at a point contiguous to the maximum end of the concave portion of the scale, as shown by dotted lines in Fig. 1, by means of an actuating-spring 7, the point or indicating end of said index being arranged to traverse the scale. Said point of the index, when the latter is in its normal position, is received between an extension 8 of the covering-plate 5 and the contiguous portion of the base-plate. This index is extended beyond its pivotal point 9 to form a contact-point 10, which projects beyond the contiguous extremity of the base-plate between the twin seats or rests 11, which are adapted to be arranged in contact with the face of a lens to be measured. These seats or rests have approximately flat faces 12 and rounded inner and outer angles 13 and 14, respectively, the inner angles 13 being adapted to bear against the surface of a convex lens, as shown in Fig. 2, and the outer angles 14 being adapted to bear against the surface of a concave lens, as shown in Fig. 1, while the approximately flat surfaces 12 are adapted to bear against the surface of a plano or flat lens or one which approaches closely to a flat surface. Thus the contact-points for concave lenses are more remote than the contact-points for convex lenses, and as the convexity of the surface of a lens diminishes the contact-points of the seats or rests move inward or toward the contact-points 13.

It is obvious that by means of the continuous scale graduated in opposite directions from an intermediate or initial point and traversed by an index which is moved more or less from its normal or initial position, according to the curvature of the surface of a lens, the relative depths or curvatures will be indicated. Hence a flat disk placed in contact with the seats or rests will cause the index to assume a position pointing to the "0" or initial point of the scale, and any variation, either in concavity or convexity, will cause a deflection of the index from this initial point of the scale either toward the concave portion 3 or the convex portion 4 of said scale.

The graduations upon the scale preferably represent dioptrics and parts thereof, whereby a measurement is indicated in the unit of measure commonly employed by opticians for this purpose.

Upon the reverse side of the base-plate I have arranged a comparative scale 15, giving the different measurements in dioptrics as expressed by the letter D opposite the respective focal distances expressed in inches, the dots in the column allotted to the dioptric measurements indicating one, two, or three quarters of a dioptric.

I preferably employ independent inner and outer seats or rests for contact, respectively, with convex and concave lenses, for the reason that wear is applied to only one side of each seat or rest, and hence the coacting seats or rests are retained in uniform condition.

Various changes in the form, proportion, and the minor details of construction may be resorted to without departing from the spirit or sacrificing any of the advantages of this invention.

Having described my invention, what I claim is—

1. A device for measuring the convexity and concavity of lenses having a base-plate provided with fixed seats or rests, an index pivotally mounted upon the base-plate and having a movable contact-point between said seats or rests, yielding means for holding the index normally at its point of rest, and a covering-plate attached to the base-plate to cover the body of the index and having an extension or tongue 8 to conceal and protect the indicating end of the index when at its point of rest, substantially as specified.

2. A device for measuring the convexity and concavity of lenses, having a sector-shaped base-plate provided near its upper edge with a segmental scale and terminating at its lower end in spaced fixed contact-points, and an index mounted for swinging movement parallel with the base-plate, the same being pivoted at one end contiguous to one side edge and projecting beyond the pivotal point between said fixed contact-points to form a movable contact-point, and the opposite end of the index being adapted to traverse said scale, said index being yieldingly held in its normal position, substantially as specified.

In testimony that I claim the foregoing as my own I have hereto affixed my signature in the presence of two witnesses.

GEORGE GOFF.

Witnesses:
W. H. RICKETTS,
D. P. NORTHRUP.